United States Patent [19]

Gerber

[11] 4,248,653
[45] Feb. 3, 1981

[54] MAGNETIC BONDING OF TABS

[75] Inventor: Howard L. Gerber, Park Forest, Ill.

[73] Assignee: The Continental Group, Inc., New York, N.Y.

[21] Appl. No.: 70,387

[22] Filed: Aug. 28, 1979

[51] Int. Cl.³ .................. B29C 19/02; B65B 61/18; H05B 5/00
[52] U.S. Cl. ............................... 156/272; 53/133; 53/412; 53/DIG. 2; 156/380; 219/10.43; 219/10.57; 219/10.79
[58] Field of Search ............... 156/272, 380; 53/412, 53/133, DIG. 2; 219/10.43, 10.57, 10.79

[56] References Cited

U.S. PATENT DOCUMENTS

| | | | |
|---|---|---|---|
| 859,416 | 7/1907 | Tyson | 53/570 |
| 3,548,140 | 12/1970 | O'Neill | 219/10.43 |
| 3,730,804 | 5/1973 | Dickey | 53/DIG. 2 |
| 3,808,074 | 4/1974 | Smith | 219/10.43 |
| 4,104,498 | 8/1978 | Gerber | 219/10.43 |

*Primary Examiner*—Douglas J. Drummond
*Attorney, Agent, or Firm*—Charles E. Brown

[57] ABSTRACT

An apparatus and method for applying metal foil-plastics material film laminate pull tabs to coated container units. A high frequency electrical energy force field is set up and induced into the metal of the pull tab with the resultant heating of the metal and the subsequent heating of the plastics material film to a bonding temperature together with the application of a magnetic repulsion force to the pull tab urging it away from its supporting head and into forced contact with the container unit.

14 Claims, 5 Drawing Figures

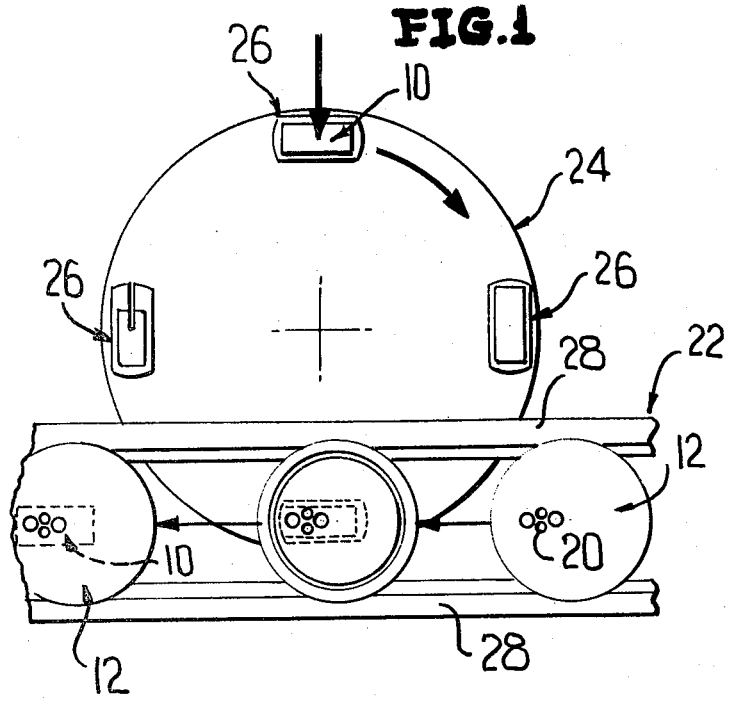
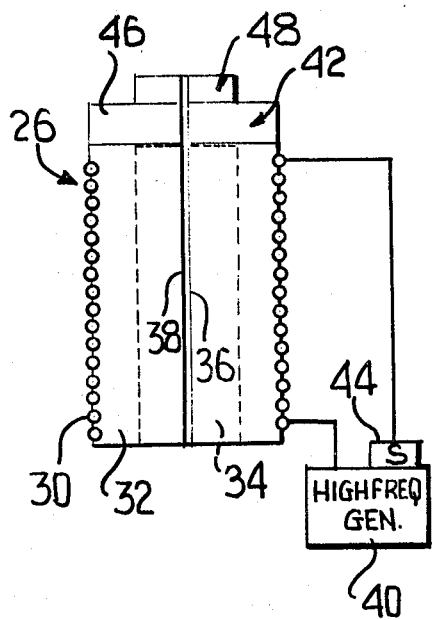
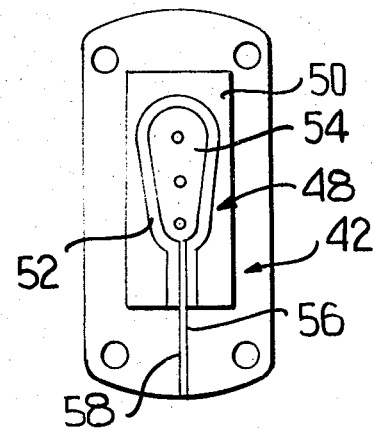
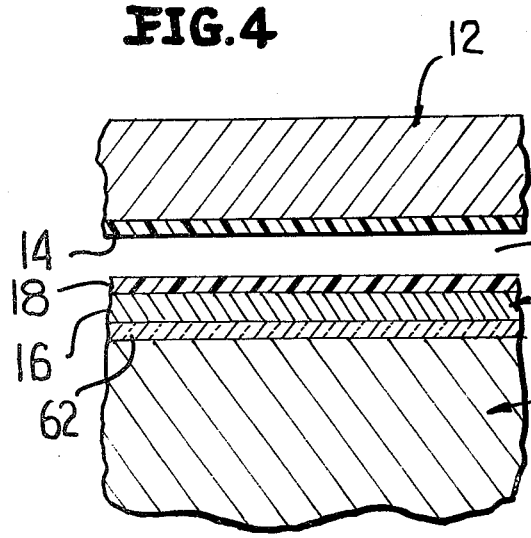
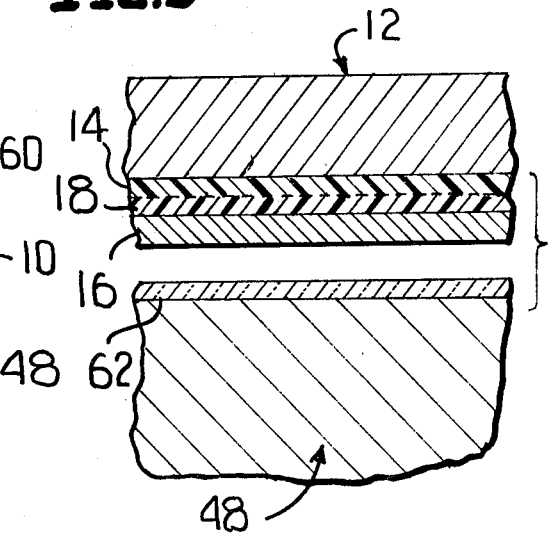

MAGNETIC BONDING OF TABS

This invention relates in general to new and useful improvements in easy opening containers, and more specifically to the application of pull tabs to container units by bonding processes.

One type of easy opening container unit is in the form of a container unit having formed therein the necessary venting and dispensing openings and thereafter a pull tab in the form of a tape is bonded to the end unit in overlying relation to the openings. The pull tabs are in the form of metal-plastics material laminates and preferably are in the form of aluminum-polypropylene laminates which are heat bondable to a plastics material coating applied to the container unit.

The existing method for bonding polypropylene aluminum coated tabs to coated container units is to heat the tabs by conduction and apply them to a preheated container unit with a magnetic force. Such an apparatus is disclosed in my U.S. Pat. No. 4,104,498, granted Aug. 1, 1978. The time required to conduction heat the polypropylene is in the neighborhood of 200 milliseconds and is due primarily to the poor heat transfer from a heated anvil to an aluminum tab.

The heat transfer from an aluminum tab to its polypropylene coating requires much less time. Thus, if heat is generated internally within the aluminum layer of the tab, the polypropylene will rapidly absorb the heat.

It has been found that a rapid method for internally generating heat within aluminum is by using large high frequency electrical fields, generally RF fields. The technique has already been perfected for the preheating of container ends.

It has been particularly found that in accordance with this invention in addition to the rapid heating a magnetic pressure is generated. Accordingly, it is possible to obtain the simultaneous heating and application of magnetic pressure for the purpose of bonding the plastics material coating of the pull tab to the plastics material coatings of container units.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic plan view showing apparatus for sequentially applying pull tabs to easy opening end units in accordance with this invention.

FIG. 2 is a schematic view showing a head for receiving a pull tab and the connection thereof to a source of high frequency electrical energy.

FIG. 3 is an enlarged plan view of a nose piece formed in accordance with this invention for heating only a preselected portion of a pull tab in a pattern.

FIG. 4 is a schematic sectional view through a container unit and a pull tab with the pull tab being carried by the nose piece and being shown prior to the application of high frequency electrical energy.

FIG. 5 is a fragmentary sectional view similar to FIG. 4, and shows the pull tab after being heated and repulsed from the nose piece and bonded to the plastics material layer of the container unit.

This invention particularly relates to the application of a pull tab 10 to a preformed container unit 12. The illustrated container unit 12 is in the form of an end unit, although it may be another container component which is intended to be provided with the easy opening feature.

The container unit 12 specifically illustrated is an end unit and is formed of metal, normally aluminum although it may also be formed of steel. The end unit 12, as best shown in FIG. 4, has formed on the outer surface thereof a plastics material coating 14. It is to be understood that in accordance with the illustrated version of the invention, when the pull tab 10 is being applied the end unit 12 is inverted and the coating 14 is disposed lowermost.

It is also to be understood that the pull tab 10 is in the form of a metal foil-plastics film laminate and in the preferred embodiment of the invention it is in the form of an aluminum foil 16 having a thin coating 18 of polypropylene. The polypropylene 18 is heat bondable to the plastics material coating 14.

Prior to the application of the pull tab to the end unit 12, the forming of the end unit 12 for securement to a container unit has been completed with formation therein of suitable dispensing and/or vent openings 20. The end units 12 are fed in a step-by-step motion by a suitable conveyor 22 to a turret applicator 24 which has mounted thereon a plurality of tab applying heads 26. The conveyor 22 may be of any type although the illustrated conveyor is in the form of a pair of rails 28 having transversely aligned end unit receiving notches in which the end units seat. The rails reciprocate and after each advancement of the end units one space, the end units are held from the rails while they retract to the next position.

The conveyor 24 is preferably in the form of a turret having a plurality of stations, there being one head 26 at each station although it is feasible to provide the heads in pairs and the conveyor 22 to be constructed to advance two end units in side-by-side relation. The turret 24 is indexed in timed relation to the advancement of the end units by the conveyor 22 so that where the conveyor 22 overlaps the turret 24 the end units 12 are aligned with the pull tabs 10. It is also preferred that the end units be heated in advance so that the end units are hot when aligned with the pull tabs.

This invention most particularly relates to the apparatus for and method of heating the pull tabs and applying the pull tabs to the hot end units. In accordance with this invention, each of the heads 26 is in the form of a transformer having a multi-turn primary winding 30 which surrounds a single turn secondary winding 32. The winding 32 has disposed within the interior thereof a core 34 which is preferably formed of a ferrite material. The single winding 32 is also preferably interrupted by way of an axial slit 36 in which there is positioned a ferrite spacer piece 38.

The primary winding 30 is suitably coupled to a high frequency generator 40 which generates electrical energy preferably in the radio frequency range. The generator 40 is so coupled to the primary winding 30 so as to generate a pulse or series of pulses having a prescribed duration. Tests have indicated that the duration of each pulse is genericially on the order of 80 milliseconds. The electrical energy within the single winding 32 is transmitted to a nose piece which is generally identified by the numeral 42. The pulse of electrical energy into the nose piece may be controlled either by the operation of the high frequency generator 40 or by a separate control switch 44.

The nose piece 42 includes a base 46 having a projection 48 generally corresponding in size and outline to the pull tab to be applied. It is to be understood, however, that the pull tab may have a folded end portion which is folded down alongside one end of the projection 48.

The nose piece 42 may be of a construction to heat the entire pull tab and thus the projection 48 may be generally rectangular. It will, however, be longitudinally split for a major part of the length thereof in alignment with the split 36 and have a ferrite spacing strip inserted therein. However, most specifically as illustrated in FIGS. 2 and 3, the projection 48 of the nose piece 42 may be of a construction for inducing electrical energy into the pull tab 10 in a preselected pattern. Thus, the projection 48 is primarily formed of a ferrite piece 50 having a generally loop shaped metal component 52 therein with there being a ferrite insert 54 within the loop shaped metal component 52. The component 52 is split in alignment with the split 36 in the secondary winding 32 and this split continues to one end of the base 46 as is clearly shown in FIG. 3. The split is identified by the numeral 56 and has a ferrite spacing piece 58 positioned therein.

At this time it is pointed out that each of the heads 26 may be provided with a separate high frequency generator 40, or there can be a single generator 40 and separate switching units 44 coupling the generator to the respective heads in timed relation with the positioning of the heads in alignment with the end units 12.

When a hot end unit 12 and a pull tab 10 are aligned as shown in FIG. 1, the plastics material coating 14 and 18 may be separated by an air gap 60. At the same time, the aluminum foil 16 of the pull tab is spaced from the projections 48 of the nose piece 42 by a thin layer of electrical insulation 62. When the hot end unit 12 and the pull tab are so positioned, a pulse of high frequency electrical energy is directed into the primary winding 30 and induced into the secondary winding 32. This high frequency electrical energy pulse passes into the nose piece 42 and the high frequency current tends to flow naturally into the tab area of the nose piece. The high frequency electrical energy field not only introduces currents into the tab 10, thereby heating it, but also causes an immediate repulsive force between the nose piece 42 and the tab 10. The heat produced in the tab 10 causes that surface of the polypropylene coating 18 to melt rapidly after the aluminum foil 16 has been heated above the melting temperature of the polypropylene. The existing magnetic force present during heating accelerates the aluminum tab through any existing air gap and onto the hot end unit 12. Upon reaching the hot end unit 12, the polypropylene coating 18 is held in intimate pressure contact with the coating 14 of the end unit and there is immediate melting of the coating 18 at the interface with the coating 14.

Satisfactory results have been obtained utilizing a 5 kilowatt generator and providing an 80 millisecond pulse. The pull tab 10 is immediately urged against the hot end unit 12, generally during the first millisecond of the pulse. The magnetic pressure causes intimate contact of the interface surface of the coatings 14 and 18 and an immediate melting of the coating 18 at the contacting interface. At the metal foil 16 side of the coating 18, the peak temperature will occur at the end of the pulse creating another molten surface on the coating 18. Thus, the coating is melting at the two surfaces thereof. The stored heat in the metal foil 16 and in the metal end 12 causes the remainder of the coating 18 to melt after R.F. extinction. The flow of the polypropylene material of the coating 18 while heating under the influence of the direct R.F. pressure is adequate for the required bond. Complete melting occurs about 15 milliseconds after the R.F. extinction.

While an air gap 60 has been shown and the same minor advantage is obtained by the kinetic energy of the pull tab 10, the air gap may be minimal and generally no greater than on the order of 10 mils.

The end unit was prior heated by a customary conduction heater and as soon as the high frequency pulse was applied, the conduction heater was removed from the end unit.

The unique feature of the invention is the application of a high frequency (RF) pulse which provides for a simultaneous heating and magnetic pressure for bonding. The system has the advantages of uniformity fo the bonding area and no need for intimate contact of the coating surfaces before bonding. Uniform bonding will occur with a uniformly applied electrical energy field.

As pointed out above, although the system will provide a uniform bond, the area of bonding can be selected on a uniformly coated pull tab. The metal foil of the tab does not distribute local forces through the entire area of the tab. When the nose piece is designed so that only one portion of the metal foil has induced current, that portion of the metal foil will be subsequently heated and the portion of the polypropylene coating aligned therewith will be in a like manner heated and the bonding will be restricted to such portion.

Another feature of the invention is that the bond can take place over an irregular surface since no applied mechanical force is applied.

Although only a preferred embodiment of the apparatus and method for applying pull tabs has been specifically illustrated and described herein, it is to be understood that minor variations may be made without departing from the spirit and scope of the invention as defined by the appended claims.

What is claimed as new is:

1. An apparatus for simultaneously heating and applying pull tabs to easy opening container units, said apparatus comprising first means for positioning a pull tab and second means for positioning a container unit, said first and second means being cooperable to align a pull tab to be applied with a container unit to receive a pull tab, said second means including a nose piece, a source of high frequency electrical energy of sufficient strength for providing a magnetic field between aligned pull tab and container unit effectively to repel the pull tab from said nose piece against the container unit, and means for coupling said high frequency electrical energy source to said nose piece to supply a pulse of high frequency electrical energy to said nose piece.

2. Apparatus according to claim 1 wherein said nose piece has a container unit energizing surface, and said surface is formed of electrically insulating material.

3. Apparatus according to claim 1 wherein said nose piece includes an electrically conductive area of a preselected pattern for heating only selected areas of a pull tab.

4. Apparatus according to claim 1 wherein said pulse has a duration on the order of 80 milliseconds.

5. Apparatus according to claim 1 wherein there is an air gap on the order of 10 mils between the pull tab and the container unit.

6. A method of applying an aluminum-plastics pull tab to a metal easy opening container unit, said method comprising the steps of aligning a pull tab and a container unit, and inducing a pulse of high frequency electrical energy into the aluminum of the pull tab and thereby heating first said alumimum and then said plastics material and applying a magnetic force to the pull tab impelling the pull tab against the container unit to effect bonding of the pull tab to the container unit.

7. The method of claim 6 wherein the container unit has a plastic material coating bondable to the plastics material of the container unit.

8. The method of claim 6 wherein the pull tab is spaced from the container unit by an air gap on the order of 10 mils.

9. The method of claim 6 wherein the pulse has a duration on the order of 80 milliseconds.

10. The method of claim 6 wherein the high frequency electrical energy induced into the aluminum is applied in a pattern.

11. The method of claim 6 wherein a nose piece is utilized for supporting the pull tab and inducing the high frequency electrical energy into the pull tab.

12. The method of claim 11 wherein the nose piece is insulated from the pull tab.

13. The method of claim 6 wherein the container unit is heated in advance of alignment with the pull tab.

14. The method of claim 7 wherein the container unit is heated in advance of alignment with the pull tab.

* * * * *